US006294613B1

(12) United States Patent
Dias

(10) Patent No.: US 6,294,613 B1
(45) Date of Patent: *Sep. 25, 2001

(54) COMPATIBILIZED POLYMER BLENDS FORMED USING A MULTIFUNCTIONAL AGENT

(75) Inventor: Anthony Jay Dias, Houston, TX (US)

(73) Assignee: ExxonMobil Chemical Patents Inc., Houston, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/977,711

(22) Filed: Nov. 25, 1997

Related U.S. Application Data

(60) Provisional application No. 60/034,290, filed on Dec. 18, 1996.

(51) Int. Cl.[7] ............................. C08L 23/22; C08L 21/00; C08L 9/00
(52) U.S. Cl. ..................... 525/209; 525/193; 525/194; 525/232; 525/233
(58) Field of Search ..................................... 525/193, 194, 525/232, 233, 209

(56) References Cited

U.S. PATENT DOCUMENTS

| | | | |
|---|---|---|---|
| 4,299,931 | 11/1981 | Coran et al. | 525/95 |
| 4,999,403 | 3/1991 | Datta et al. | 525/322 |
| 5,162,445 | 11/1992 | Powers et al. | 525/333.4 |
| 5,391,625 | 2/1995 | Arjunan | 525/215 |
| 5,397,837 | 3/1995 | Arjunan | 525/72 |
| 5,473,017 | * 12/1995 | Wang | 525/193 |
| 5,621,044 | * 4/1997 | Wang | 525/193 |
| 5,700,871 | * 12/1997 | Arjunan et al. | 525/74 |
| 5,904,220 | * 5/1999 | Shinichiro et al. | 180/300 |
| 6,140,424 | * 10/2000 | Patel et al. | 525/221 |

FOREIGN PATENT DOCUMENTS

| | | |
|---|---|---|
| WO 9107451 | 5/1991 | (WO) . |
| WO 9424208 | 10/1994 | (WO) . |
| WO 95/09197 | 4/1995 | (WO) . |

OTHER PUBLICATIONS

*Macromolecules*, v.12(1), Jan.–Feb., 1979—pp. 131–134, "Homogeneous and Heterogeneous Blends of Polybutadiene, Polyisoprene, and Corresponding Diblock Copolymers" R. E. Cohen and A. R. Ramos.

*Macromolecules*, v.15(2), Mar.–Apr., 1982—pp. 370–375, "Properties of Block Copolymers and Homopolymer Blends Comprised of 1,2–Polybutadiene and 1,4–Polybutadiene"—R. E. Cohen and D. E. Wilfong.

*Journal of Macromolecular Science, Phys.*, v. B17(4), 1980—pp. 625–651, "Modelling of the Viscoelastic Behavior of Homogeneous and Heterogeneous Blends of Polyisoprene and Polybutadiene"—R. E. Cohen and A. R. Ramos.

*Journal of Polymer Science, Polymer Physics, Ed.*, v. 18 (1980)—pp. 2143–2148, "Nonequilibrium Morphologies of a Diblock Copolymer of Polyisoprene and Poly(n–Butyl Methacrylate)"—R. E. Cohen and F. S. Bates.

Whelan, "Polymer Technology Dictionary", Chapman & Hall, New York, pp 170–171 (1994).*

* cited by examiner

*Primary Examiner*—Donald R. Wilson
(74) *Attorney, Agent, or Firm*—Myron B. Kurtzman; Joseph F. Reidy; Kevin M. Faulkner

(57) ABSTRACT

A compatibilized blend of general purpose rubbers (GPR) and polymers containing benzylic halide groups are produced through solventless reactions utilizing a multifunctional agent containing a diene reactive group and a benzylic halo reactive group.

6 Claims, No Drawings

COMPATIBILIZED POLYMER BLENDS FORMED USING A MULTIFUNCTIONAL AGENT

APPLICATION FOR U.S. PATENT

This Application is based on Provisional Application 60/034,290 filed December 18, 1996

BACKGROUND OF THE INVENTION

1. Field of the Invention

The invention is directed to compatibilized polymer blends formed using a multifunctional agent in a polymer blend, preferably consisting of general purpose rubbers and benzyl halide containing polymers.

2. Related Art

Relatively saturated elastomeric polymers, such as butyl rubber, which is a copolymer of isobutylene with a small percentage of isoprene units are known. These polymers demonstrate low air permeability, relatively low glass transition temperatures, broad damping peaks, excellent environmental aging resistance, and other such properties which render these polymers of commercial significance in blends with polymers or in tire production. Butyl rubber generally is incompatible with most other polymers.

It has been known for some time that blends of incompatible polymers can be improved in some cases by adding a suitable compatibilizer so as to alter the morphology of these blends. More particularly, to be successful it has been necessary to reduce the domain sizes for both of the polymers in the blend.

It is known in some instances to use block copolymers as compatibilizers. For example, several studies have shown attempts to compatibilize rubber-rubber blends of polyisoprene and polybutadiene by using diblock materials composed of these two materials. See R. Cohen et al. *Macromolecules* 15, 370, 1982; Macromolecules 12, 131, 1979; J. Polym. Sci., Polym. Phys. 18, 2148, 1980; *J Macromol. Sci.-Phys.* B17 (4), 625, 1980. Most of these block copolymers have been previously produced by sequential anionic polymerization processes, which are thus limited to a relatively small number of monomers. It is also known to compatibilize other blends, such as rubber-plastic blends of ethylene-propylene rubber with polypropylene, by using graft copolymers of these two materials. See A. Y Coran et al., U.S. Pat. No. 4,299,931, as well as co-pending commonly assigned applications Ser. No. 07/264,484 now U.S. Pat. No. 4,999,403 and Ser. No. 07/264,485, filed on Oct. 28, 1988.

Others have proposed different solutions for preparing compatibilized blends comprising isoolefin polymers. For example, Wang, in WO 95/09197 describes intervulcanizable blends comprising a mixture of a diolefin polymer or copolymer and a saturated or highly saturated elastomeric copolymer having a number average molecular weight of at least 10,000 and containing from about 0.01 up to about 10 mole % of "Y" functional groups randomly distributed along and pendant to the elastomeric polymer chain, said Y functional groups containing an olefinic or vinyl double bond positioned alpha, beta to a substituent group which activates said double bond towards free radical addition reactions. The preferred activating substituent groups are carboxyl-containing groups, phosphoryl-containing groups, sulfonyl-containing groups, nitrile-containing groups, aromatic ring-containing groups or a combination of such groups.

It would be desirable to obtain a process not employing a solvent. The present invention provides compatibilized blends formed by a solventless reaction between two generally incompatible polymers with a multifunctional compound/agent.

SUMMARY OF THE INVENTION

The invention is directed to a solventless process for forming compatibilized blends of general purpose rubbers and benzyl halide polymers comprising mixing at least one general purpose rubber and a benzyl halide containing polymer in the presence of a multifunctional agent, said agent comprising a compound represented by the general formula $(X)_n-(R)_m-(Y)_p$, wherein m is equal to or greater than zero, and desirably range from about 1 to about 10, n and p are greater than zero and desirably range from about 1 to about 100. X is diene reactive group. Preferably the diene reactive group is selected from the group consisting of (1) enophiles, (2) free radicals and radical traps, (3) free radical traps, and (4) nucleophiles. R is selected from the group consisting of alkyls, aryls, alkyl substituted aryls preferably having from about 1 to about 100 carbon atoms and polymers. And Y is a benzylic halogen reactive group, like a nucleophile. In addition, the present invention is also directed to using compatibilized blends of the present invention to compatibilize other polymer blends by mixing the compatibilized blend with at least one general purpose rubber and at least one polymer to form a new compatibilized blend.

The invention is further directed to a compatibilized blend of general purpose rubbers and benzyl halide containing polymers comprising mixing general purpose rubbers, benzyl halide containing polymers and a multifunctional agent comprising a compound having the formula $(X)_n-(R)_m-(Y)_p$, wherein m is equal to or greater than zero, n and p are greater than zero, X is a diene reactive group, R is selected from the group consisting of alkyls, aryls, alkyl substituted aryls having from about 1 to about 100 desirably 1-20 carbon atoms and polymers, and Y is a benzylic halide reactive group. In addition, the present invention is directed to the cured compatibilized blends described above.

DETAILED DESCRIPTION OF THE INVENTION

The present invention is directed to compatibilized blends of general purpose rubbers ("GPR") and benzyl halide containing polymers. The present invention is also directed to a process for the production of compatibilized blends of GPR and benzyl halide containing polymers. Moreover, the present invention is directed to compatibilized blends of GPR and poly(isobutylene-co-methylstyrene) containing 4-halomethylene units (hereinafter BIPMS) disclosed in U.S. Pat. No. 5,162,445, herein incorporated by reference. The present invention is further directed to a solventless process for the production of compatibilized blends of GPR and BIPMS. In addition, the present invention is directed to utilizing compatibilized blends of the present invention to compatibilize other polymer blends.

In a particularly preferred embodiment, the compatibilized blends of the present invention are comprised of a blend of general purpose rubbers and BIPMS. The benzyl halide copolymers are desirably elastomeric copolymers of isobutylene, a para-methyl styrene containing from about 0.5 to about 20 mole percent para-methyl styrene wherein up to about 60 mole% of the methyl substituent groups present on the aromatic ring contain a bromine or chlorine atom.

These copolymers and their method of preparation are disclosed in U.S. Pat. No. 5,162,445, hereby incorporated by reference. The blends of the present invention may include but are not limited to the following general purpose rubbers: natural rubber (NR), polyisoprene (IR), polybutadiene (BR), poly(styrene-co-butadiene) (SBR), and poly(acrylonitrile-co-butadiene) (NBR).

Generally, the blends of the present invention may comprise from about 5 to about 95 percent by weight GPR and from about 5 to about 95 percent by weight benzyl halide containing polymer. Preferably the blends comprise from about 15 to about 85 percent by weight GPR and from about 15 to about 85 percent by weight benzyl halide containing polymer. Most preferably, the blends of the present invention are comprised of about 30 to about 70 percent by weight GPR and from about 30 to about 70 percent by weight benzyl halide containing polymer. The multifunctional agent employed in the practice of the present invention generally comprises from about 0.01 to about 10 percent by weight, preferably 0.01 to about 3 percent, of the total blend weight.

The process of the present invention may be carried out in a single step or in two steps. For example, the multifunctional agent may be mixed with the GPR or the benzyl halide polymer first and then added to the other component with mixing and heating. Alternatively, the process of the present invention may be carried out in a single pass or step wherein the multifunctional agent, GPR, and benzyl halide polymer are mixed and heated together simultaneously.

Utilizing either process described above, the reaction is conducted under solventless conditions using internal mixers, extruders, and rubber milling equipment. Typical mixers include Brabender™ and Banbury™ mixers. As stated above, the rubber compositions are placed in the mixers along with the multifunctional agent and reacted under shear and heat to yield the compatibilized blends of the present invention.

The multifunctional agent of the present invention is a multifunctional compound containing both a diene reactive group and a benzyl halide reactive group. The multifunctional agent of the present invention has the following formula: $(X)_n-(R)_m-(Y)_p$, wherein m is equal to or greater than zero, and n and p are equal to or greater than one. X is a diene reactive group and may be selected from the group consisting of (1) enophiles, (2) free radicals and free radical traps, (3) free radical traps and (4) nucleophiles. The enophiles which are useful in the practice of the present invention include, but are not limited to, maleic anhydride and its activated derivatives, including but not limited to carboxy maleic, sulfo maleic, methyl maleic, and phenyl maleic, etc., as well as the analogous nitrogen species, triazolinediones. The free radical sources useful in the practice of the present invention include, but are not limited to, peroxides, azo compounds, and polymer bond cleavage, i.e., radicals formed during GPR mastication. Preferred peroxides include dicumyl peroxide, di-t-butyl peroxide, benzoyl peroxide, bis p-chlorobenzoyl peroxide, and t-butyl cumyl peroxide. Preferred azo compounds include 2,2'-azo bis(isobutyronitrile); 1,1'-azo bis(cyclohexanecarlonitrile); 4,4'-azo bis(4-cyanovaleric acid); and 2,2'-azo bis(2-amidinopropane).

The radicals can either add to the olefin or extract a proton leading to polymeric radicals. These radicals can be trapped using suitable radical sinks or traps, e.g., sulphides, sulphenylchlorides, and thioacids. Alternately, the radicals can be trapped utilizing free-radical polymerizable monomers, e.g., acrylic, and methacrylic acid.

Y is the benzylic halide reactive group and is a nucleophile. Preferably, the nucleophilic groups which are useful in the practice of the present invention include, but are not limited to carboxylates, amines, phosphines, alkoxides, phenoxides, and thiolates.

R may be an alkyl, aryl or an alkyl-substituted aryl containing from about 1 to about 100 carbon atoms, or a polymer having a Mw up to about 100,000. Polymers which are suitable as R may be prepared by controlled polymerization methods such as "living" anionic, cationic, or free-radical reactions. These "living polymers" are conveniently prepared by contacting the monomers or combination of monomers with a polymerization initiator in the presence of an inert organic diluent which does not participate in or interfere with the polymerization reaction. For example, dimethylaminopropyllithium may be used to initiate the "living" polymerization of dienes like butadiene and isoprene. This "living" chain is then terminated with propylene sulfide. The polymer thus has an end which can react with benzylhalide and a second end which is diene reactive. Alternatively, polymers suitable as R may be obtained by ring-opening polymerization of cyclic monomers using a suitable functionalized initiator. The molecular weight of the R polymer may vary depending upon the application; however, typically polymers desirably having a molecular weight ranging from about 500 to about 100,000 are useful in the practice of the present invention.

The compatibilized blends of the present invention may be cured generally using curing systems known in the rubber industry. For example, curing systems useful in curing the blends of the present invention include but are not limited to systems comprising sulfur compounds, zinc compounds, metal compounds, radical initiators, etc. Specific compounds useful as curatives in the present invention include, but are not limited to, zinc oxide, stearic acid, tetramethylthiuram disulfide (TMTD), 4,4'-dithiodimorpholine (DTDM), tetrabutylthiunram disulfide (TBTD), benzothiazyl disulfide (MBTS), hexamethylene -1,6, -bisthiosulfate disodium salt dihydrate (ERP 390), 2-(morpholinothio) benzothiazole (MBS or MOR), blends comprising 90% by weight MOR and 10% by weight MBTS (MOR90), N-oxydiethylene thiocarbamyl-N-oxydiethylene sulfenamide (OTOS) zinc 2-ethyl hexanoate (2EH); and MC sulfur.

The present invention, while not meant to be limited by, may be better understood by reference to the following examples.

In the following examples, the benzyl halide containing polymer (BIPMS) was brominated poly(isobutylene-co-4-methyl styrene containing 7.5 wt percent, 4-methyl styrene, and 2 wt percent benzyl bromide, and having a Mooney viscosity ML(1+8) 125° C. of 45±5.

EXAMPLE I

Compatibilization of Natural Rubber with BIPMS: Radicals Generated During Mastication and Tetramethylammonium Mercaptoacetate Salt as Radical Trap a. The tetramethylammonium mercaptoacetate salt (hereinafter "salt") was prepared through neutralization of commercially available materials. 0.921 g of 0.01 M Mercaptoacetic acid (obtained from Aldrich) was neutralized with 3.646 g of 0.01 M tetramethylammonium hydroxide (obtained as a 25 weight percent methanol solution from Aldrich). The water and methanol were removed under vacuum to yield a white salt.

b. Two Pass Compatibilized Blend: 40 g of NR was placed in a Brabender™ cavity along with 0.25 g of the salt, prepared previously. The rubber salt mixture was masticated at 50 rpm and 60° C. for 15 minutes. The contents of the Brabender™ were removed. A fraction of the reacted natural rubber was placed in the Brabender™ along with 35 g of BIPMS. The mixture was mixed at 20° C. and 10 rpm for 5 minutes. The Brabender™ was then heated to 50° C. at which time the speed was increased to 100 rpm. Under these conditions, the temperature increased to 115° C. The mixture was kept at 100 rpm and 115° C. for 15 minutes and then removed. The compatibilized blend was then compared to a noncompatibilized blend using electron microscopy. The results are reported in Table 1 below.

EXAMPLE 2

Graft Reaction of Natural Rubber with BIPMS Using Radicals Generated from Peroxide (dicumyl peroxide) and Tetrabutylammonium Methacrylate as Radical Trap in a Single Pass Mix a. The salt was prepared by neutralizing commercially available materials. 0.874 g of methacrylic acid was neutralized with 10 ml of a 1 molar solution of tetrabutylammonium hydroxide in methanol. The methanol was removed under nitrogen to yield a white salt.

b. One pass compatibilized blend: 33.2 g BIPMS and 14.23 g of natural rubber were placed in a Brabender™ mixer. The rubber was mixed 5 minutes at 85–90° C. and 60 rpm. The temperature was raised to 150° C. and 0.051 g of dicumyl peroxide and 0.471 g of the tetrabutylammonium methacrylate was added. The mix was reacted for an additional five minutes. The compatibilized blend was then compared to a noncompatibilized blend using electron microscopy The results are reported in Table 1 below.

EXAMPLE 3

Graft Reaction of Polybutadiene with BIPMS Using Radicals Generated from Peroxide (dicumyl peroxide) and Tetrabutylammonium 6,8 dithiooctanoate as Radical Trap in a Two Pass Mix a. The salt was prepared by neutralizing commercially available materials. 0.2064 g of 6,8-dithiooctanoic acid was neutralized with 10.1 ml of a 1 molar solution of tetrabutylammonium hydroxide in methanol. The methanol and water were removed under nitrogen to yield a yellow product.

b. Two pass compatibilized blend: 47.12 g of polybutadiene was placed in a Brabender™ mixer and mixed 5 minutes at 50° C. and 40 rpm. The temperature was raised to 150–160° C. and 0.051 g of dicumyl peroxide and 0.471 g of the tetrabutylammonium methacrylate was added. The mix was reacted for an additional five minutes. The contents of the Brabender™ mixer were removed. A fraction of the reacted polybutadiene (14.76 g) was placed in the Brabender™ mixer along with 33.5 g of BIPMS. The mixture was mixed at 20° C. and 10 rpm for 5 minutes. The Brabender™ mixer was then heated to 110° C. at which temperature the speed was increased to 80 rpm. Under these conditions, the temperature increased to 115° C. These conditions were maintained for 5 minutes and then the compatibilized blend was removed. The compatibilized blend was then compared to a noncompatibilized blend using electron microscopy. The results are reported in Table 1 below.

EXAMPLE 4

Graft Reaction of Nitrile Rubber (Paracril B) with BIPMS Using Radicals Generated from Peroxide (dicumyl peroxide) and Tetrabutylammonium 6,8-dithiooctanoate as Radical Trap in a Two Pass Mix a. The salt was prepared by neutralizing commercially available materials: 2064 g of 6,8-dithiooctanoic acid was neutralized with 10.1 ml of a 1 molar solution of tetrabutylammonium hydroxide in methanol. The methanol and water were removed under nitrogen to yield a yellow product.

b. Two pass compatibilized blend: 47.5 g of nitrile rubber was placed in a Brabender™ mixer and mixed 5 minutes at 50° C. and 40 rpm. The temperature was raised to 150–160° C. and 0.051 g of dicumyl peroxide and 0.487 g of the tetrabutylammonium methacrylate was added. The mix was reacted for an additional five minutes. The contents of the Brabender™ mixer were removed. A fraction of the reacted nitrile rubber (14.76 g) was placed in the Brabender™ mixer along with 33.5 g of BIPMS. The mixture was mixed at 20° C. and 10 rpm for 5 minutes. The Brabender™ mixer was then heated to 155° C. at which temperature the speed was increased to 80 rpm. Under these conditions, the temperature increased to 180° C. These conditions were maintained for 5 minutes and then the compatibilized blend was removed. The compatibilized blend was then compared to a noncompatibilized blend using electron microscopy. The results are reported in Table 1 below.

EXAMPLE 5

Graft Reaction of Polybutadiene with BIPMS Using Radicals Generated from Peroxide (dicumyl peroxide) and Tetrabutylammonium mercaptoacetate as Radical Trap in a Two Pass Mix a. The salt was prepared by neutralizing commercially available materials. 0.9212 g of mercaptoacetic acid was neutralized with 10.1 ml of a 1 molar solution of tetrabutylammonium hydroxide in methanol. The methanol and water were removed under nitrogen to yield a white product.

b. Two pass compatibilized blend: 47.12 g of polybutadiene was placed in a Brabender™ mixer and mixed 5 minutes at 50° C. and 40 rpm. The temperature was raised to 150–160° C. and 0.051 g of dicumyl peroxide and 0.471 g of the tetrabutylammonium methacrylate was added. The mix was reacted for an additional five minutes. The contents of the Brabender™ mixer were removed. A fraction of the reacted polybutadiene (14.76 g) was placed in the Brabender™ mixer along with 33.5 g of BIPMS. The mixture was mixed at 20° C. and 10 rpm for 5 minutes. The Brabender™ mixer was then heated to 110° C. at which temperature the speed was increased to 80 rpm. Under these conditions, the temperature increased to 115° C. These conditions were maintained for 5 minutes and then the compatibilized blend was removed. The compatibilized blend was then compared to a noncompatibilized blend using electron microscopy. The results are reported in Table 1 below.

EXAMPLE 6

Graft Reaction of Natural Rubber with BIPMS Using Radicals Generated from Peroxide (dicumyl peroxide) and Tetrabutylammonium Dithiopropionate as Radical Trap in a Single Pass Mix a. The salt was prepared by neutralizing commercially available materials. 2.108 g of dithiopropionic acid was neutralized with 10 ml of a 1 molar solution of tetrabutylammonium hydroxide in methanol. The methanol and water were removed under nitrogen to yield a white salt.

b. One pass compatibilized blend: 33.22 g BIPMS and 14.21 g of natural rubber were placed in a Brabender™ mixer. The rubber was mixed 5 minutes at 100° C. and 60 rpm. The temperature was raised to 150° C. and 0.05 g of dicumyl peroxide and 0.5 g of the tetrabutylammonium dithopropionate was added. The mix was reacted for an additional five minutes. The compatibilized blend was then compared to a noncompatibilized blend using electron microscopy. The results are reported in Table 1 below.

EXAMPLE 7

Graft Reaction of Styrene-Butadiene Rubber with BIPMS Using Radicals Generated from Azo-decomposition of Tetrabutylammonium 4, 4azobiscyanovalerate in a Single Pass Mix a. The salt was prepared by neutralizing commercially available materials. 4.17 g of 4,4azobiscyanovalerate was neutralized with 40 ml of a 1 molar solution of tetrabutylammonium hydroxide in methanol. The methanol and water were removed under nitrogen to yield a white product.

b. Single pass compatibilized blend: 82.02 g of styrene-butadiene rubber (SBR 1502) and 191.38 g of BIPMS were placed in a B-Banbury™ mixer along with 1.37 g of tetrabutylammonium 4,4azobiscyanovalerate. The mix was dropped at 180° F. after 3 minutes of mixing. The rubber mix internal temperature was measured with a pyrometer after dropping. The rubber was typically 50° F. higher in temperature than the Banbury™ drop temperature. The compatibilized blend was then compared to a noncompatibilized blend using electron microscopy. The results are reported in Table 1 below.

All blends were characterized using low voltage scanning electron microscopy on osmium stained images. The phase size information was obtained by sampling the image using lines drawn at random on the images. The data was collected at two magnifications (9,000 and 20,000). The average dispersed phase for the compatibilized blend and a comparative control are presented in Table 1 below. The smaller the dispersed phase size the more compatibilized the blend.

TABLE 1

Dispersed Phase Size Results for Examples 1–7.

| Example # | Compatibilized Dispersed Phase Size (micrometers) | Comparative Blend Dispersed Phase Size (micrometers) |
|---|---|---|
| 1 | 0.1 | .5 |
| 2 | 0.1 | 1 |
| 3 | 0.2 | 2 |

TABLE 1-continued

Dispersed Phase Size Results for Examples 1–7.

| Example # | Compatibilized Dispersed Phase Size (micrometers) | Comparative Blend Dispersed Phase Size (micrometers) |
|---|---|---|
| 4 | 0.7 | 30 |
| 5 | 0.7 | 2 |
| 6 | 0.2 | 2 |
| 7 | 0.7 | 3 |

In addition to controlling the phase size one can practice the reaction in a manner which produces polymer phase inversion. The following examples are illustrative of this benefit.

EXAMPLE 8

Graft Reaction of Natural Rubber with BIPMS Using Radicals Generated from Peroxide (dicumyl peroxide) and Tetrabutylammonium thiosalicylate as Radical Trap in a Single Pass Mix a. The salt was prepared by neutralizing commercially available materials. 1.546 g of thiosalicylic acid was neutralized with 10 ml of a 1 molar solution of tetrabutylammonium hydroxide in methanol. The methanol and water were removed under nitrogen to yield a white salt.

b. One pass compatibilized blend: 33.27 g of BIPMS and 14.24 g of natural rubber were placed in a Brabender™ mixer. The rubber was mixed 5 minutes at 100° C. and 60 rpm. The temperature was raised to 150° C. and 0.05 g of dicumyl peroxide and 0.5 g of the tetrabutylammonium thiosalicylate was added. The mix was reacted for an additional five minutes. The resultant blend comprised a continuous natural rubber phase with 1 micrometer dispersed phase.

EXAMPLE 9

Graft Reaction of Natural Rubber with BIPMS Using Radicals Generated from Peroxide (dicumyl peroxide) and Tetrabutylammonium thiosalicylate as Radical Trap in a Two Pass Mix a. The salt was prepared by neutralizing commercially available materials. 1.546 g of thosalicylic acid was neutralized with 10 of a 1 molar solution of tetrabutylammonium hydroxide in methanol. The methanol and water were removed under nitrogen to yield a white salt.

b. Two pass compatibilized blend: 47.48 g of natural rubber was placed in a Brabender™ mixer and mixed 5 minutes at 50° C. and 40 rpm. The temperature was raised to 150–160°C. and 0.051 g of dicumyl peroxide and 0.49 g of the tetrabutylammonium thiosalicylate was added. The mix was reacted for an additional five minutes. The contents of the Brabender™ mixer were removed. A fraction of the reacted natural rubber (14.35 g) was placed in a Brabender™ mixer along with 33.59 g of BIPMS. The mixture was mixed at 20° C. and 10 rpm for 5 minutes. The Brabender™ mixer was then heated to 110°C. at which temperature the speed was increased to 80 rpm. Under these conditions, the temperature increased to 115° C. These conditions were maintained for 5 minutes and then the compatibilized blend was removed. The resultant blend comprised a continuous BIPMS phase with a 0.5 micrometer dispersed natural rubber phase.

I claim:

1. A compatibilized blend comprising a brominated poly(isobutylene-co-4-methylstyrene); a general purpose rubber selected from the group consisting of natural rubber, polyisoprene, polybutadiene, nitrile rubber, poly(styrene-co-butadiene), and poly(acrylonitrile-co-butadiene); and an agent selected from the group consisting of tetrabutylammonium 6,8-dithiooctanoate, tetrabutylammonium dithiopropionate, and tetrabutylammonium mercaptoacetate.

2. The blend of claim 1, also comprising a free radical source.

3. The blend of claim 2, wherein the free radical source is selected from the group consisting of dicumyl peroxide, di-t-butyl peroxide, benzoyl peroxide, bis p-chlorobenzoyl peroxide, t-butyl cumyl peroxide, 2,2'-azo bis(isobutyronitrile); 1,1'-azo bis(cyclohexanecarlonitrile); 4,4'-azo bis(4-cyanovaleric acid); and 2,2'-azo bis(2-amidinopropane) and mixtures thereof.

4. The blend of claim 1, wherein the blend is formed in a single step process.

5. The blend of claim 4, wherein the single step involves contacting the brominated poly(isobutylene-co-4-methylstyrene); the general purpose rubber selected from the group consisting of natural rubber, polyisoprene, polybutadiene, nitrile rubber, poly(styrene-co-butadiene), and poly(acrylonitrile-co-butadiene); and the agent.

6. The blend of claim 1, wherein the blend is produced by a solventless process.

* * * * *